United States Patent [19]

Cafmeyer et al.

[11] Patent Number: 5,106,040
[45] Date of Patent: Apr. 21, 1992

[54] STEERING COLUMN WIRE PROTECTOR

[75] Inventors: René J. B. Cafmeyer, Rochester Hills; Kazuharu Kondo, Northville, both of Mich.

[73] Assignees: Yazaki Eds Engineering, Inc., Canton; Chrysler Corporation, Highland Park, both of Mich.

[21] Appl. No.: 636,668

[22] Filed: Jan. 2, 1991

[51] Int. Cl.$^5$ ............................................. F16L 3/00
[52] U.S. Cl. ..................................... 248/73; 248/291; 248/298
[58] Field of Search .............. 248/73, 74.3, 74.4, 248/65, 68.1, 298, 291, 297.2, 70, 49; 174/97; 200/61.54, 61.57; 74/484 R

[56] References Cited

U.S. PATENT DOCUMENTS

| | | |
|---|---|---|
| 3,894,707 | 7/1975 | Heard ................................ 248/73 X |
| 4,368,348 | 1/1983 | Eichelberger et al. ........... 174/97 X |
| 4,789,286 | 12/1988 | Laput ........................... 248/297.2 X |
| 4,864,082 | 9/1989 | Ono et al. ........................... 174/97 |

Primary Examiner—Ramon O. Ramirez
Attorney, Agent, or Firm—Krass & Young

[57] ABSTRACT

A steering column wire protector for securely positioning and protecting wiring with respect to a steering column while permitting both axial and rotational movement of the wiring relative to the steering column in response to adjustment of a steering wheel to which the wiring is connected. The wire protector includes a bracket fixed to the wall of the steering column and a carrier supporting and holding a portion of the wiring. A slide pin formed on the carrier cooperates with a guide track in the bracket to permit the carrier to slide axially along the bracket as well as to pivot relative to the steering column axis. The wiring is preferably taped to the carrier. The carrier and bracket can be removably joined for shipment and handling purposes.

7 Claims, 2 Drawing Sheets

STEERING COLUMN WIRE PROTECTOR

FIELD OF THE INVENTION

The present invention relates to wire and wire bundle carriers and particularly to a wire and wire bundle carrier adapted for use in combination with adjustable-position automotive steering wheels.

BACKGROUND OF THE INVENTION

Vehicle steering wheels and the portion of the steering column adjacent the wheel and accessible to the driver are typically provided with controls such as switches and levers wired to various electrical systems in the vehicle; e.g., lights, horn, windshield wipers, air bag inflators and turn signals. The wires usually extend from devices or switches on the wheel to a wiring harness or circuit board and may run within or along the length of the steering column.

A problem arises when the steering wheel is adjustable in position relative to the steering column; e.g., the so-called "tilt-wheel" in which the plane of the wheel can be adjusted in angular position relative to the steering column axis. As the steering wheel is adjusted, the wires connected to the controls on the wheel are not only curved or bent, but may also be pushed or pulled axially along the steering column. The wires are therefore subject to substantial movement with respect to the steering column, giving rise to the possibility of abrasion damage to the wire, insulation damage, open circuits and short circuit. A similar problem is encountered with axially adjustable steering wheels and in combination tilt-axial adjusting wheels.

Protective carriers for use with wires or wire bundles in automobiles are known in the art. Ono et al U.S. Pat. No. 4,864,082 discloses a U-shaped longitudinal carrier for a bundle of wires. A number of spaces formed within the carrier housing serve to separate the wire bundle into a number of smaller bundles, making it easier to keep the wires organized and reducing the rigidity of the main bundle so that the wires more closely follow the contour of the carrier. A cover with latch means is shown for closing the open portion of the carrier to retain the wires inside. The Ono et al device is not designed for use with a wire bundle subject to movement, nor is it suitable for use with a moveable wire bundle located in or along a steering column.

Japanese Utility Model Publication No. 62-15579 discloses a wire harness protector for use with bundles of wires subject to motion in an axial direction only. A bracket having a longitudinal rail member is mounted on a stationary wall surface in the vehicle, and a protector housing having a longitudinal slot structure is slidingly mounted on the rail member for movement in an axial direction if the wires are pushed or pulled. This device is not suitable for use with tilt wheels in that it does not permit any rotation of the wire bundle. Also, a substantial amount of friction is developed between the long rail member and the slot, hindering the sliding motion of the housing, and no means are disclosed for retaining the wires in a fixed position relative to the protector housing or for limiting the range of housing travel in the rail to prevent it from sliding off.

SUMMARY OF THE INVENTION

The present invention is a wire and wire bundle carrier for use in combination with the steering column of a vehicle having a steering wheel, the plane of which is adjustable in relation to the steering column. The carrier is mounted to the wall of the steering column and supports and holds a number of wires or a wire bundle or "harness" to protect the wires from abrasion, twisting and entanglement. The carrier operates in combination with a bracket and is slidable in the axial direction and rotatable about a displaceable pivot axis with respect to the steering column wall; i.e., the pivot point moves axially with the wiring relative to the bracket as necessary to accommodate the adjustment of the steering wheel. At the same time the carrier keeps the wiring consistently positioned with respect to the steering column and protects it from abrasion and damage. The invention, therefore, accommodates wheel tilt, pure axial wheel position adjustment and combinations thereof.

In an illustrative embodiment of the invention, a bracket is mounted to the outside wall of the steering column and exhibits a slot-like guide track extending in the direction of the longitudinal axis of the steering column. A carrier which supports and holds the wiring has a track follower pin projecting laterally therefrom to ride in the guide track. The pin has an enlarged head for retaining the pin in the track. The pin acts both as pivot and slide such that the housing slides in the axial direction along the length of the track, and pivots or rotates about an axis normal to the steering column axis at any point along the length of the track.

In a preferred embodiment of the invention, the carrier is a plastic molding with an essentially L-shaped cross section to which the wire or wire bundle is firmly attached by tape. The opposite longitudinal ends of the carrier are offset so as to provide clearance with the bracket, which clearance affords room for the tape wrappings. The bracket is further provided with a retainer mechanism which allows the carrier to be assembled thereto for shipping as a unit, yet allows easy disassociation for installation.

Other features and advantages of the invention will become apparent upon further reading of the specification.

DETAILED DESCRIPTION OF THE DRAWINGS

Figure 1:
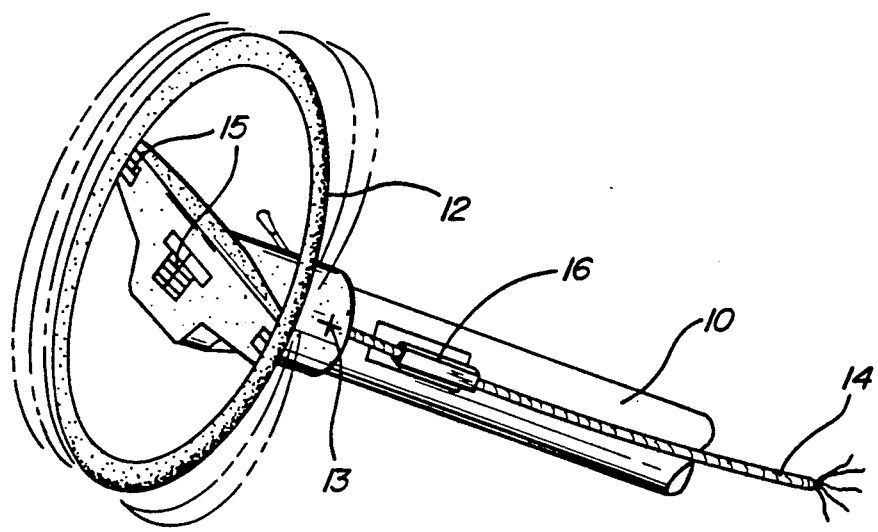
FIG. 1 is a perspective view of a steering column incorporating a device manufactured in accordance with the present invention.

Referring to FIG. 1, a portion of a steering column 10 is shown having an adjustable steering wheel 12 mounted at one end and a wiring bundle 14 running along a portion of its exterior. Wiring bundle 14 provides electrical connections between various controls and/or devices 15 on steering wheel 12 and their associated vehicle systems (e.g., lights, horn, turn signals, air bag inflator actuators and the like). Steering wheel 12 is tilt-adjustable about pivot point 13 and axially adjustable in the direction of the steering column longitudinal axis. Whether the wheel 12 is tilt-adjustable only or tiltand axially adjustable, it exerts both axial and rotational forces on wire bundle 14 as it is adjusted by the driver.

The steering column wire protector of the present invention is also shown in FIG. 1 generally at 16, mounted to the wall of steering column 10 essentially adjacent pivot point 13 of steering wheel 12. Wire protector 16 positions wire bundle 14 securely with respect to steering column 10, while permitting a range of axial and rotational movement of the wire bundle necessary to accommodate the adjustments made to steering wheel 12.

Although wire protector 16 is preferably adjacent pivot point 13 of the steering wheel, and preferably mounted to the outside wall of the steering column 10, mounting positions in which wire protector 16 is not immediately adjacent pivot point 13, or in which it is mounted within steering column 10, are also within the scope of the invention.

Figure 2:
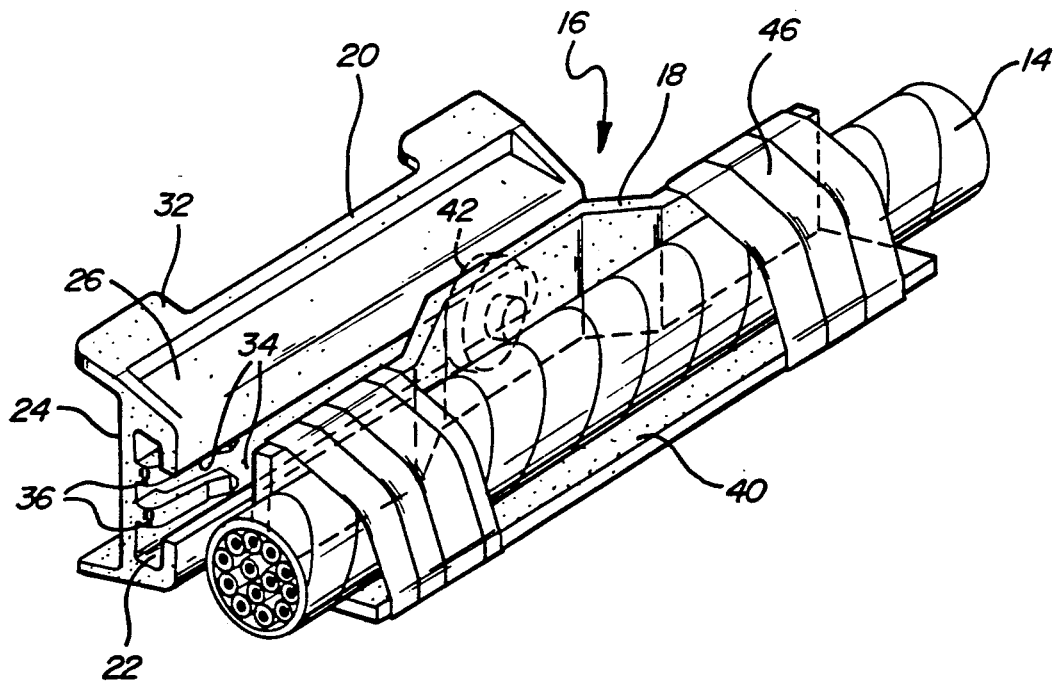
FIG. 2 is a perspective view of a preferred embodiment of the invention wherein the carrier is assembled with the bracket.
Figure 3:
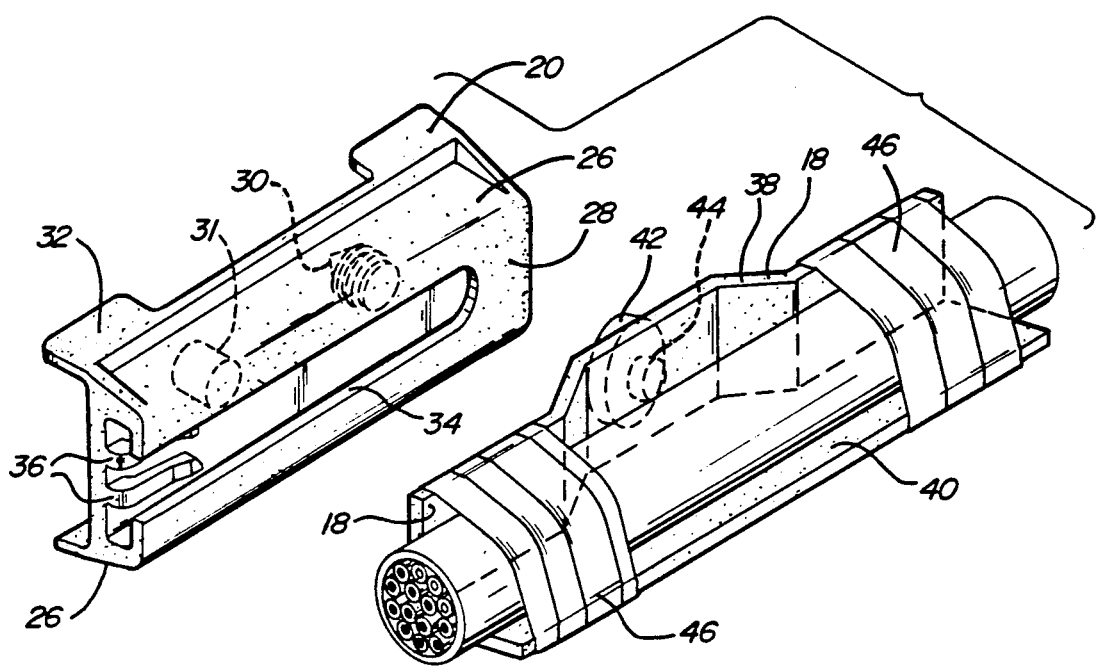
FIG. 3 shows the elements of FIG. 2 separated from each other.
Figure 4:
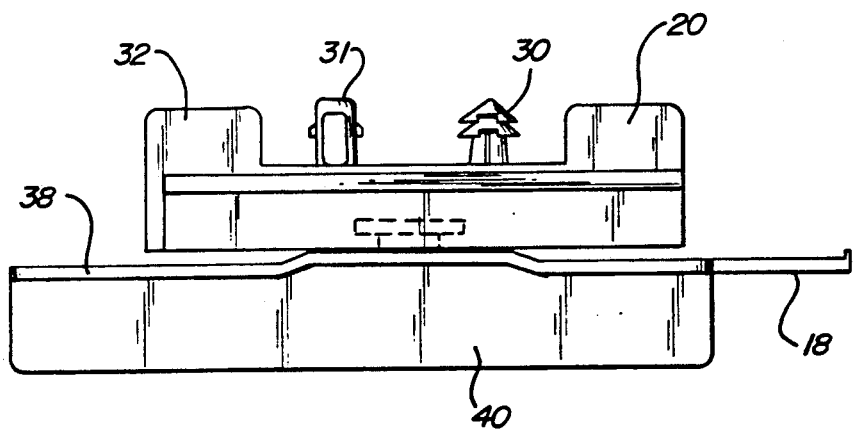
FIG. 4 is a top view of the device of FIGS. 2 and 3 before assembly to a wiring bundle.

In FIGS. 2 and 3, wire protector 16 is shown to comprise a carrier 18 and a bracket 20, both preferably molded from a suitable polymer or plastic. However, it is to be understood that other materials or combinations of materials such as plastic and metal can be used.

Bracket 20 exhibits a hollow cavity 22 extending along its length and defined by rear wall 24, side walls 26 and slotted front wall 28. Bracket 20 is fastened to the outside wall of steering column 10 by way of self-locking barb 30 and locator pin 31, both of which fit into preformed holes (not shown). Bracket 20 is spaced outwardly from the steering column wall by feet 32.

A longitudinal guide track 34 is formed in front wall 28 of bracket 20, open at the left end and closed at the right end as seen in FIGS. 2 and 3. A pair of beveled, resilient retainer fingers 36 are disposed adjacent the open end of guide track 34 and seated on rear wall 24. Fingers 36 have smooth upper surfaces and free ends extending toward the closed end of the guide track 34. The free ends of limit fingers 36 are resiliently movable away from guide track 34 to permit the disassociation of carrier 18 from bracket 20 as hereinafter explained.

Carrier 18 comprises an elongated plastic molding having in the illustrated embodiment a substantially L-shaped cross-section created by planar integral leaf portions 38 and 40. In a typical installation the carrier is about four inches long. Portion 38 carries on the outside surface thereof an integral headed pin 42 which cooperates with guide track 34 of bracket 20 to hold the elements 18 and 20 together, yet to afford both a longitudinal sliding relationship and a pivotal relationship between them as installed.

Describing the carrier 20 in greater detail, it is provided on its rear face with a slide pin 42 having a cylindrical stem portion 44. The diameter of stem 44 is just less than the width of guide track 34 to ensure a close, sliding fit therebetween, and the diameter of head 42 is substantially greater so that the slide pin is retained in the guide track 34. In this embodiment, stem 44 is integral with housing 18. Stem 44 and head 42 are preferably cylindrical, but may take other forms which cooperate with cavity 22 to permit carrier 18 to slide axially with respect to bracket 20 and retain slide pin 42 in guide track 34.

In use, wire bundle 14 is placed on carrier 18 and held thereof by wrappings of ordinary tape 46 such that the wire bundle 14 is held fast to carrier 18. Bracket 20 is assembled to column 10. Slide pin 42 is inserted into the open end of guide track 34. Limit fingers 36 yield to pin 42 as it is inserted, then spring back to limit the range of forward travel of slide pin 42 in bracket 20.

Once slide pin 42 is inserted into the guide track 34 in bracket 20, carrier 18 holding wire bundle 14 is positioned securely with respect to the steering column, spaced from the wall of the column by bracket 20 and restricted to the range of travel defined by the length of guide track 34. However, the novel wiring protector of the present invention permits the bundle 14 to respond to both axial and tilt-adjustment of the steering wheel even as it remains securely positioned with respect to the steering column.

The tangential point contact between cylindrical stem 44 of slide pin 42 and the surfaces of guide track 34 provide a minimum of frictional resistance to the back and forth sliding motion and pivotal rotation of wire bundle 14 and carrier 18. This prevents carrier 18 from sticking or catching on bracket 20 and creating excessive forces between the wire bundle and protector housing.

The opposite ends of leaf portion 38 are offset to provide clearance relative to the front surface of bracket 20. This affords room for tape 46 so that it does not create frictional drag by rubbing against bracket 20, nor is the tape 46 abraded by rubbing against bucket 20.

The fingers 36 allow the carrier 18 and bracket 20 to be assembled as a unit for shipping and handling between the point of manufacture and the point of assembly. The elements 18 and 20 are easily taken apart for installation by using a blunt tool to depress fingers 36 and slide the pin 42 out of the track 34.

We claim:

1. A vehicle steering column wiring protector comprising:
   a guide bracket secured to a steering column and defining a guide track extending parallel to the steering column longitudinal axis;
   a wiring carrier positioned adjacent the guide bracket and adapted to receive the column wiring in fixed relation therewith; the carrier further including a follower means extending into and cooperating with the guide track to permit the carrier to move both axially and pivotally relative to the bracket over substantially the length of the guide track; and means for fastening the column wiring to the carrier.

2. Apparatus as defined in claim 1, wherein said follower means comprises a substantially cylindrical slide pin formed on said carrier.

3. Apparatus as defined in claim 2, wherein said follower means comprise a slide pin having a cylindrical stem portion mounted on an external surface of the carrier, and a head portion connected to said stem portion, said head portion having a diameter greater than the diameter of said stem portion and greater than the width of the guide track.

4. Apparatus as defined in claim 1, wherein said carrier has a substantially L-shaped cross-section.

5. Apparatus as defined in claim 1, further including means formed on said bracket for retaining said follower means in said guide track.

6. Apparatus as defined in claim 4, wherein said L-shaped cross section comprises two integral leaf portions, one of said leaves having offset opposite planar portions to provide clearance relative to the bracket when assembled together therewith.

7. Apparatus as defined in claim 6, wherein said means for fastening the column wiring to the carrier comprises tape wrapped around at least one of said offset opposite planar portions and the column wiring, the tape being out of contact with the guide bracket.

* * * * *